United States Patent [19]

Takahara

[11] Patent Number: 4,978,894

[45] Date of Patent: Dec. 18, 1990

[54] SINGLE PHASE TO THREE PHASE RECTIFIER/INVERTER WITH DC RIPPLE COMPENSATION

[75] Inventor: Eimei Takahara, Koganei, Japan

[73] Assignee: Kabushiki Kaisha Toshiba, Kawasaki, Japan

[21] Appl. No.: 403,363

[22] Filed: Sep. 6, 1989

[30] Foreign Application Priority Data

Sep. 8, 1988 [JP] Japan ............... 63-223407

[51] Int. Cl.[5] .............. H02P 7/63; H02M 5/452
[52] U.S. Cl. .................. 318/768; 318/811; 363/36; 363/41
[58] Field of Search .............. 318/749, 752, 768, 803, 318/811; 363/36, 41, 46

[56] References Cited

U.S. PATENT DOCUMENTS 4,247,888  1/1981  Angquist .................... 363/36

FOREIGN PATENT DOCUMENTS 49693   5/1981  Japan .................... 318/811
58781   5/1981  Japan .................... 363/36
51316   3/1983  Japan .................... 363/46
135392  6/1986  Japan .................... 318/768

OTHER PUBLICATIONS

Nakamura et al., "Restraint Method of Beat Phenomenon on Converter-Inverter System," UDC, vol. 109, No. 5, May 1989, pp. 363-369.

Primary Examiner—William H. Beha, Jr.
Attorney, Agent, or Firm—Foley & Lardner, Schwartz, Jeffery, Schwaab, Mack, Blumenthal & Evans

[57] ABSTRACT

In a power converter apparatus, variations contained in a single-phase AC input voltage cause a beat phenomenon in a three-phase DC/AC inverter. To avoid such a beat phenomenon, the single-phase AC input voltage is converted into a DC input voltage having ripple components and the ripple components are filtered from the input voltage so as to derive an input DC voltage. The input DC voltage is inserted into a three-phase AC voltage. Variations contained in the single-phase AC input voltage are detected to obtain a variation detecting signal and the inversion is controlled in a pulse width modulation control mode based upon the variation detecting signal and a reference signal.

8 Claims, 4 Drawing Sheets

SINGLE PHASE TO THREE PHASE RECTIFIER/INVERTER WITH DC RIPPLE COMPENSATION

BACKGROUND OF THE INVENTION

1. Field of the Invention

The present invention relates to a power converting apparatus in which single-phase AC power is input and once converted into DC power and, thereafter, the DC power is further converted into three-phase AC power by using a DC/AC inverter, thereby driving an induction motor as a load.

2. Description of the Prior Art

As a power converting apparatus in which single-phase AC power is input and an AC induction motor is driven as in an electric vehicle, there has conventionally been known an apparatus of the type in which AC power is converted into DC power by using a PWM converter and is further converted into an AC having a variable voltage and a variable frequency by an inverter and is given to an induction motor. FIG. 1 shows an example of such a conventional power converting apparatus. Single-phase AC power is received by a pantagraph "PAN" and stepped down by a transformer "T" and input to a PWM converter "COV" through a reactor "L" and is once converted into DC power. A capacitor "CO" is connected to the output side of the converter "COV". Further, a three-phase DC/AC inverter "INV" is connected to the capacitor. The three-phase AC power is generated by this inverter "INV" and an induction motor "IM" is driven.

Such a type of power converting apparatus has been disclosed in, for instance, K. Nakamura et al., "Restraint Method of Beat Phenomenon on Converter-Inverter System", UDC, Vol. 109, No. 5, from pages 363 to 369, May, 1989.

However, such a conventional power converting apparatus has the following problems. That is, the PWM converter "COV" converts an AC to a DC, and the voltage and current on the DC side are smoothed by the capacitor CO. However, the DC voltage causes pulsatory vibrations unless the capacitance value of the capacitor CO is infinite. When the DC voltage including the pulsatory vibrations is used as an input power source and is converted into the desirable AC power by the DC/AC inverter "INV", a so-called beat phenomenon occurs and pulsatory vibrations are caused in the motor current due to the mutual interaction between the pulsating frequency and the frequency of the converted AC. Such a pulsatory vibration phenomenon not only gives pulsatory vibrations to the motor torque output but also causes a problem such that an instantaneous current from the DC/AC inverter "INV" increases.

Although the DC/AC inverter "INV" has the capability to control both of the output frequency and the output voltage, the output voltage can be controlled by controlling a conduction ratio of a switching element employed in the DC/AC inverter "INV", that is, by adjusting a pulse width.

There is, however, a problem that the peak value of the output voltage waveform of the inverter "INV" increases or decreases due to an influence by the pulsatory vibrations of the DC voltage, so that the voltage value fluctuates and the output current is also fluctuated.

In this case, since the peak value of the voltage cannot be controlled, the pulse width thereof is controlled as a practical control method. That is, when the peak value of the output voltage is high, the pulse width is controlled to be narrowed. When the peak value is low, the pulse width is controlled to be widened. In this manner, the average value or effective value can be controlled as a parameter of an area of the voltage. Eventually, the voltage fluctuation can be suppressed.

In the case of embodying such a conventional method, it is necessary to detect the pulsatory vibrations of the DC voltage and to control the output voltage waveform of the DC/AC inverter. However, since the capacitance value of the capacitor employed in the DC circuit is generally set as large as possible, the pulsatory vibrations themselves of the DC voltage is not relatively large, which is therefore difficult to be detected. It is preferable that the input AC voltage as a major factor of the pulsatory vibrations of the DC voltage is detected, and the fluctuation of the DC voltage is predicted on the basis of the detected input AC voltage, and thus, the predicted fluctuation is desirable to be used for the inverter voltage control.

The present invention has been made in an attempt to solve the problems in the conventional power converting apparatuses and therefore, has an object of the invention to provide a power converting apparatus which can reduce the pulsatory vibration phenomenon of a motor current and can avoid the instable operation of a DC/AC inverter in consideration of the above drawbacks.

SUMMARY OF THE INVENTION

To achieve the above-described object, a power converting apparatus according to the present invention comprises:

power converter means (COV) for converting a single-phase AC input voltage (3A) into a DC input voltage having ripple components:

filtering means (CO) for filtering out the ripple components from the input voltage applied from the power converter means (COV) so as to derive an input DC voltage;

DC/AC inverter means (INV) for inverting the input DC voltage into a three-phase AC voltage to be applied to a three-phase load (IM);

detector means (RF1:C1:PW-DET) for detecting variations contained in the single-phase AC input voltage (3A) to obtain a variation detecting signal;

reference signal generating means (OS) for generating a reference signal (3J); and, inverter controlling means (CN:MP:AD:COMP) for controlling the DC/AC inverter means (INV) in a pulse width modulation control mode based upon the variation detecting signal and reference signal.

According to a power converting apparatus of the invention, an input AC voltage is detected by a power source voltage detecting section and is rectified by a rectifying section. The DC component in the rectified voltage is eliminated by a capacitor circuit, thereby separating only the fluctuation AC component. In the ordinary case, since the DC voltage fluctuation increases as the voltage to be consumed as a load is large, the fluctuation amount is corrected in a power correcting section by an element of a load electric power.

An inverter controller receives a voltage command and a frequency command and makes a gate control signal such that a switching element in an inverter main circuit operates at a desirable timing. In general, a timing signal is produced by comparing a reference three-phase sine wave and a triangle wave functioning as harmonics from a triangle wave oscillator. A correction signal for a DC voltage pulsation amount which is output through the power correcting section, inverting circuit, and multiplier is added to each sine wave derived from the inverter controller by an adder. An output signal of the adder is compared with the triangle wave from the triangle wave oscillator by a comparator. Thus, the switching timing signal which provides the AC power which was corrected for the DC pulsation component is output as a gate signal.

BRIEF DESCRIPTION OF THE DRAWINGS

For a better understanding of the present invention, reference is made to the descriptions in conjunction with the accompanying drawings, in which.

DETAILED DESCRIPTION OF THE PREFERRED EMBODIMENTS

BASIC IDEA

A power converting apparatus of the invention is made on the basis of the following basic idea.

A power converting apparatus of the invention comprises: a power converting section for converting a single-phase AC power into DC power; a smoothing capacitor connected to an output of the power converting section; a DC/AC inverter for converting the DC power derived from the smoothing capacitor into three-phase AC power in a pulse width control mode; an AC motor as a load; a power source voltage detecting section for detecting a voltage of the single-phase AC power; a rectifying section for rectifying an output from the power source voltage detecting section; a capacitor circuit to eliminate the DC component in an output from the rectifying section; a power correcting section to apply a correction value caused by the motor power to an output of the capacitor circuit; an inverting circuit to invert an output of the power correcting section; an inverter controller to perform a gate control of the inverter; multiplyer circuits to multiply each of square wave signals corresponding to three-phase voltages as outputs of the inverter controller and a signal from the DC/AC inverting circuit; adder circuits to add each of sine wave signals of the three-phase voltages of the outputs of the inverter controller and each of output signals of the multiplying circuits; a triangle wave oscillator; and comparators for comparing a triangle signal from the triangle wave oscillator and an output from each of the adding circuits and for setting their outputs as control signals of gates of the inverter.

The features of the present invention are summarized as follows. Single-phase input power is rectified to produce DC input power. Thereafter, this DC input power is DC/AC-inverted by the DC/AC inverter into the three-phase output power. The variations contained in the AC voltage of the single-phase input power are detected. Based upon the detected variations, the DC/AC inverter is controlled with reference to the reference signal. That is to say, the pulse widths of the inverted AC voltages are controlled in the DC/AC inverter under the control of the inverter controller.

ARRANGEMENT OF FIRST POWER CONVERTER

Figure 1:
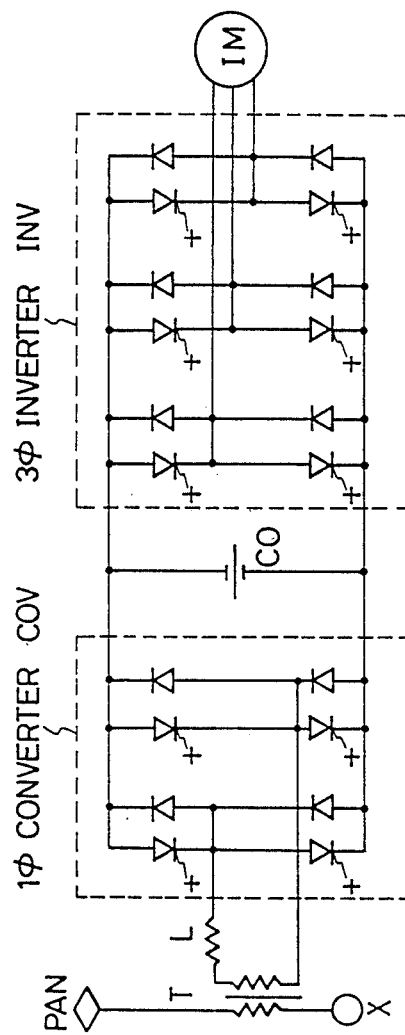
FIG. 1 is a schematic block diagram of a conventional power converting apparatus.
Figure 2:
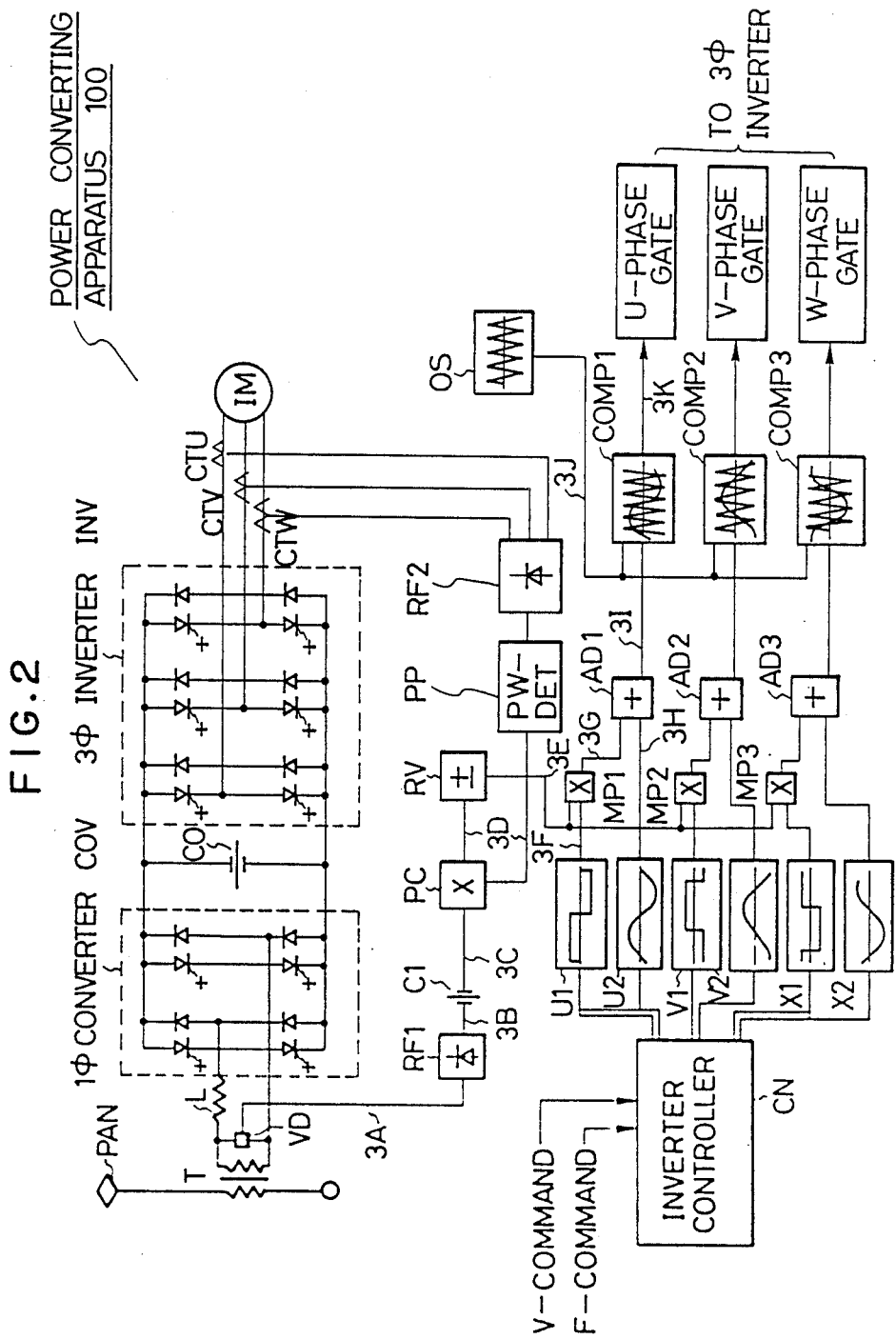
FIG. 2 is a schematic block diagram of a power converting apparatus according to one preferred embodiment.

FIG. 2 is a block diagram of a power converting apparatus 100 according to a preferred embodiment of the invention and its major circuit portion has a similar construction to that of the conventional power converting apparatus shown in FIG. 1. Single-phase AC power from the pantagraph "PAN" is stepped down by the transformer "T" and is input to the PWM converter "COV" through the reactor "L".

On the other hand, DC power derived from the single-phase converter "COV" is input to the three-phase DC/AC inverter "INV" through the smoothing capacitor "CO" the input DC power is controlled to have a variable voltage and a variable frequency and then output as three-phase AC power to the induction motor "IM". The typical power of the three-phase induction motor is selected to be from 100 to 300 kw (electric train), and 500 to 1 Mkw (electric locomotive).

A voltage detector "VD" is provided in an AC input section for the above main circuit. A rectifier "RF1", a DC component eliminating capacitor "$C_1$", a power correcting multiplier "PC", and an inverting circuit "RV" are connected to the voltage detector "VD".

Current transformers "CTU", "CTV", and "CTW" are connected to input lines of the induction motor "IM", respectively. A rectifier "$RF_2$" and a power detector "PD" are connected to those current transformers. An output of the power detector "PD" is input to the power correcting multiplier "PC".

A voltage command signal and a frequency command signal are given to an inverter controller "CN". Its output side is connected to rectangular signals $U_1$, $V_1$, and $T_1$ of three phases U, V, and W and to sine waves $U_2$, $V_2$, and $D_2$.

The rectangular signals $U_1$, $V_1$, and $X_1$ are supplied to multipliers "$MP_1$", "$MP_2$", and "$MP_3$" and, further, to adders "$AD_1$", "$AD_2$", and "$AD_3$". On the other hand, the outputs of the sine waves $U_2$, $V_2$, and $X_2$ are connected to inputs of the adders "$AD_1$", "$AD_2$", and "$AD_3$".

Outputs of the adders "$AD_1$", "$AD_2$", and "$AD_3$" are connected to comparators "$COMP_1$", "$COMP_2$", and "$COMP_3$" and compared with a triangle wave signal from a triangle wave oscillator "OS".

Outputs of the comparators "$COMP_1$", "$COMP_2$", and "$COMP_3$" are respectively given as gate signals of three phases U, V, and T to gates of thyristors of the DC/AC inverter "INV". The sine wave signals correspond to signal waves, the frequency of which determines the oscillation frequency of the PWM-controlled inverter unit (INV). The triangle wave signal corresponds to a carrier wave used for controlling the PWM-controlled inverter unit (INV).

Power Converting Operation

The operation of the power converting apparatus 100 with having the above circuit arrangement will now be described with reference to FIG. 3.

Figure 3A:
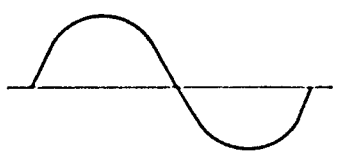
FIGS. 3A to 3K are waveform charts of the power converting operations of the power converting apparatus shown in FIG. 1; and, FIGS. 4A to 4K are waveform charts of other power converting operations of the power converting apparatus shown in FIG. 2.
Figure 3B:
Figure 3C:
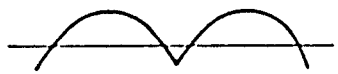

An input waveform of the voltage detector "DV" has a sine waveform shown in FIG. 3A (shown in the circuit diagram of FIG. 2. The same waveforms shall also be applied to other waveforms). The input voltage is rectified as shown in FIG. 3B by the rectifier $RF_1$. The DC component is eliminated by the DC component eliminating capacitor "$C_1$" and its output waveform becomes as shown in FIG. 3C and is input to the power correcting circuit "PC".

Figure 3D:
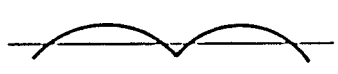
Figure 3E:
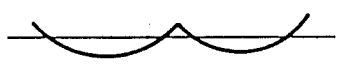

An output of the power correcting circuit "PC" becomes as shown in FIG. 3D and is inverted as shown in FIG. 3E by an inverting circuit "RV".

The output of the power correcting circuit "PC" changes in accordance with consuming power of the induction motor "IM" functioning as a load. When the load power consumption is large, and therefore, when the load current is also large, the peak value is large.

On the other hand, as outputs of the inverter controller "CN", the rectangular signals $U_1$, $V_1$, and $W_1$ and sine waves $U_2$, $V_2$, and $X_2$ are output in accordance with three phases U, V, and X, respectively. For instance, the output of the square wave $U_1$ of the U phase becomes as shown in FIG. 3F.

Figure 3F:
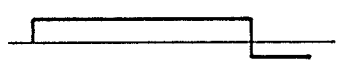
Figure 3G:
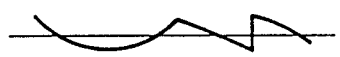
Figure 3H:
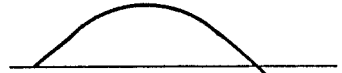
Figure 3I:

The product of the waveform of FIG. 3F and the waveform from the inverting circuit "RV" in FIG. 3E is obtained as outputs of the multipliers "$MP_1$", "$MP_2$", and "$MP_3$" and becomes as shown in FIG. 3G. The square waves $U_1$, $V_1$, and $X_1$ are added to the outputs of the multipliers "$MP_1$", "$MP_2$", and "$MP_3$" by the adders "$AD_1$", "$AD_2$", and "$AD_3$", so that output waves as shown in FIGS. 3H and 3I are finally obtained.

Figure 3J:
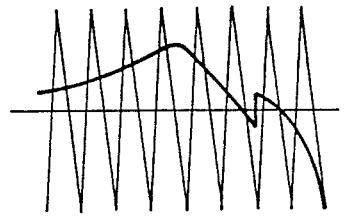
Figure 3K:
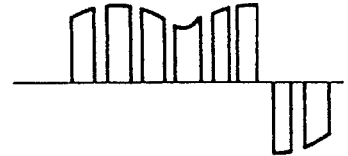
Figure 4A:
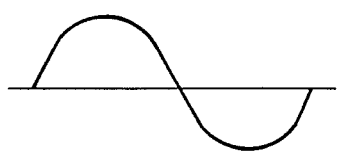
Figure 4B:
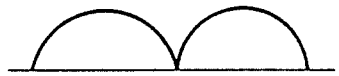
Figure 4C:
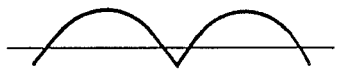
Figure 4D:
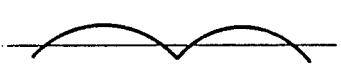
Figure 4E:
Figure 4F:
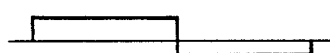
Figure 4G:
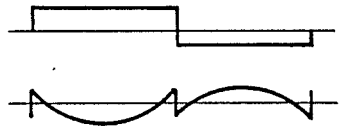
Figure 4H:
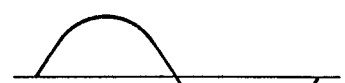
Figure 4I:
Figure 4J:
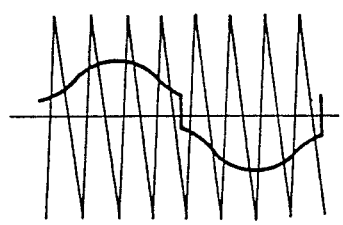
Figure 4K:
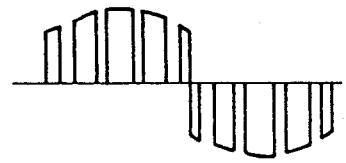

The outputs of the adders "$AD_1$", "$AD_2$", and "$AD_3$" are compared with the triangle wave from the triangle wave oscillator "OS" as shown in FIG. 3J by the comparators "$COMP_1$", "$COMP_2$", and "$COMP_3$". Their outputs become modulated gate signals as shown in FIG. 3K.

Although FIGS. 3 and 4 show signal waveforms in the same portion, respectively, in the case of FIG. 4, the relationship between the frequency on the power source side and the frequency on the motor side differs from that in the case of FIG. 3. Although the motor frequency is lower than the power source frequency in FIG. 3, both of them are almost equal in the case of FIG. 4.

As mentioned above, there is a feature such that not only the inverter controller "CN" executes the modulation by comparing the three-phase square waves $U_1$, $V_1$, and $X_1$ and the sine waves $U_2$, $V_2$, and $X_2$ which are output in accordance with the voltage command signal and frequency command signal with the triangle wave from the triangle wave oscillator "OS", but also the inverter controller "CN" executes the correction for the fluctuation of the load power, and by modulating this by the triangle wave, the fluctuation of the load power is compensated and the pulsatory vibrations can be suppressed.

That is, in the case of FIG. 4, since the DC voltage pulsating frequency is twice as high as the frequency on the motor side, if the normal modulation is executed, the high portion of the DC voltage coincides with the peak of the AC voltage. Therefore, the voltage waveform becomes large and the current also increases. However, by executing the correction to the waveforms which are compared with the triangle wave and by narrowing the pulse width than that in the case of the normal modulation as in the preferred embodiment, the average voltage value can be reduced. Eventually, the current is decreased and the pulsatory vibrations contained in the load power can be suppressed.

As previously described above, according to the invention, the pulsatory vibrations of the DC voltage is detected from the input AC voltage waveform and the pulse width of the output voltage of the inverter is corrected by the detection signal. Therefore, by widening or narrowing the pulse width of the output voltage from the DC/AC inverter so as to become opposite to the peak value of the output voltage of the inverter, the motor current containing less pulsatory vibration can be obtained.

What is claimed is:

1. A power converting apparatus comprising:
   power converter means for converting a single-phase AC input voltage into a DC input voltage having ripple components:
   filter means for smoothening said ripple components from said DC input voltage supplied from said power converter means so as to derive an input DC voltage;
   DC/AC inverter means for inverting said input DC voltage into a three-phase AC voltage to be applied to a three-phase load;
   detector means for detecting voltage variations proportional to said ripple components from said single-phase AC input voltage to obtain a phase component of the single-phase AC input voltage variations;
   reference signal generating means for generating a reference signal;
   inverter command correcting means for correcting inverter commands having a frequency command and a voltage command based upon said phase component of said single-phase AC input voltage variations so as to produce a modulating signal; and,
   modulator means for modulating a carrier wave of said reference signal with said modulating signal in order to obtain a control signal for controlling said DC/AC inverter means in a pulse width modulation control mode.

2. A power converting apparatus as claimed in claim 1, wherein said detector means includes:
   a voltage divider for subdividing said single-phase AC input voltage into a subdivided AC voltage;
   a rectifier for rectifying said subdivided AC voltage to derive a pulsatory DC voltage having said variations proportional to said ripple components; and
   a capacitor for eliminating a DC component contained in said pulsatory DC voltage to obtain said phase component of said single-phase AC input voltage variations.

3. A power converting apparatus as claimed in claim 2, further comprising:
   a power correcting unit for correcting said phase component of said single-phase AC input voltage variations in response to conditions of said load.

4. A power converting apparatus as claimed in claim 1, wherein said DC/AC inverter means includes a plurality of thyristors connected in a three-phase connection mode.

5. A power converting apparatus as claimed in claim 4, wherein said inverter command correcting means includes multiplier circuits, and adder circuits, and said modulator means includes comparator circuits, and produces gate control signals based upon said phase component obtained from said detector means and said reference signal, whereby gate electrodes of said thyristors are controlled in response to said gate control signals in said pulse width modulation control mode.

6. A power converting apparatus as claimed in claim 5, wherein said inverter command correcting means produces rectangular wave signals and sinusoidal wave signals in response to both said voltage command and frequency command;

said multiplier circuits for multiplying said rectangular wave signals by said phase component to obtain multiplied variation detecting signals;

said adder circuits for adding said multiplied variation detecting signals to said sinusoidal wave signals to obtain added variation detecting signals; and said comparator circuits for comparing said added variation detecting signals with said reference signal so as to finally produce said gate control signals.

7. A power converting apparatus as claimed in claim 1, wherein said reference signal generating means is a triangle wave oscillator.

8. A power converting apparatus as claimed in claim 1, wherein said load is a three-phase induction motor.

* * * * *